Feb. 18, 1936.  B. LOEFFLER  2,030,995
WELDED STEEL ENGINE
Filed Nov. 27, 1934    7 Sheets-Sheet 7

INVENTOR:
Bruno Loeffler,
BY
Hoguet, Neary & Campbell
HIS ATTORNEYS

Patented Feb. 18, 1936

2,030,995

UNITED STATES PATENT OFFICE 2,030,995

WELDED STEEL ENGINE

Bruno Loeffler, Plainfield, N. J., assignor to International Motor Company, New York, N. Y., a corporation of Delaware Application November 27, 1934, Serial No. 754,942

13 Claims. (Cl. 123—195)

The present invention relates to engines of the internal combustion type and embodies, more specifically, an improved form of internal combustion engine, the structure of which is composed of a plurality of stampings and drop-forgings by means of which the weight of the engine is greatly reduced per unit of power over similar internal combustion engines now available.

Not only is the advantage of lightness achieved by means of the present invention but other factors are improved to render the resulting structure more acceptable and of greater advantage from the standpoint of performance. For example, the formation of the structure is such as to greatly improve the cooling operations necessary and by reason of the advantages growing through the present invention the engine lubrication is accomplished more effectively as well as the effective combustion of the fuel supplied.

More particularly, the present invention relates to the general subject matter shown and described in applicant's copending application Ser. No. 694,043 for Steel motor and method of manufacture filed October 18, 1934, and the present invention embodies certain improved structural characteristics as have been found to materially expedite the manufacture and assembly of the various component parts where the engine is designed and adapted for particular uses. As distinguished from the structure shown and described in the above identified copending application, the present invention embodies structural features by means of which the welding operations may be carried out by the method of welding now commonly called "fuse-welding" or in other words, the welding operations take place while the parts to be welded together are maintained merely in abutting relationship rather than in interengaging relationship with cooperating filleted portions.

Further improvements and advantages in the present structure will be apparent as the invention is described in detail in connection with the accompanying drawings, wherein:

Figure 2 is a view in side elevation looking from the opposite direction in which Figure 1 is taken and showing the manifold side of the engine.

With reference to the above drawings, the present invention includes an engine formed of a plurality of composite sections which are united by welding operations of the fuse-welding type, the sections consisting of a cylinder head section, a cylinder block section, and a crank case section. The cylinder head section consists of a bottom plate 20 to which is welded side walls 21 and a top plate 22. One of the side walls 21 is formed with a plurality of spark plug recesses 23 cooperating with combustion chamber forming means 24 for each cylinder, the last named means being welded directly to the bottom plate 20 and cooperating with a fuel inlet port 25 for each cylinder. Inlet and exhaust pipes 26 and 27, respectively, are welded in the side wall opposite from the spark plug recesses and are also welded to the bottom plate 20 to cooperate with ports 28 formed in the latter. Each of the inlet and exhaust pipes is preferably formed with valve guides 29, the upper extremities of which are welded to the top plate 22. Suitable spacer plates 30 are provided for spacing and securing the elements together, the details of the entire head structure being separately described and claimed in applicant's copending application, Ser. No. 750,148 filed Oct. 26, 1934 for Steel motor.

Cooperating with the cylinder head structure above described is a cylinder block section upon which the cylinder head section is adapted to be mounted. This cylinder block section consists of a top plate 31 about and depending from which side walls 32 and 33, and end walls 34 are secured. The cylinder top plate is formed with a projecting portion beyond the side wall 33 to which an outer wall 35 is secured. This outer wall is spaced from the wall 33 and, in combination with the wall 33, forms push rod compartments. The cylinder block section is also formed with a bottom wall 36 which may constitute a continuation of the side and end walls. The outer wall 35 is formed with end sections 37 which may be welded at 38 to the adjacent corners formed between the end walls and the wall 33.

Within the outer wall 35 openings 39 are formed, the wall being reinforced by rings 40 which are welded thereto about the said openings. At the top of the walls forming the cylinder block section, reinforcing rings 41 are secured in order that the structure may have adequate strength beneath the top plate 31. The bottom wall 36 is formed with apertures 42 within which cylinders 43 are received and welded. The upper ends of the cylinders are welded to the top plate 31 as described hereinafter and the space between the cylinders 43 and the walls of the cylinder block section thus form a cooling jacket within which cooling fluid may be circulated.

Figure 6:
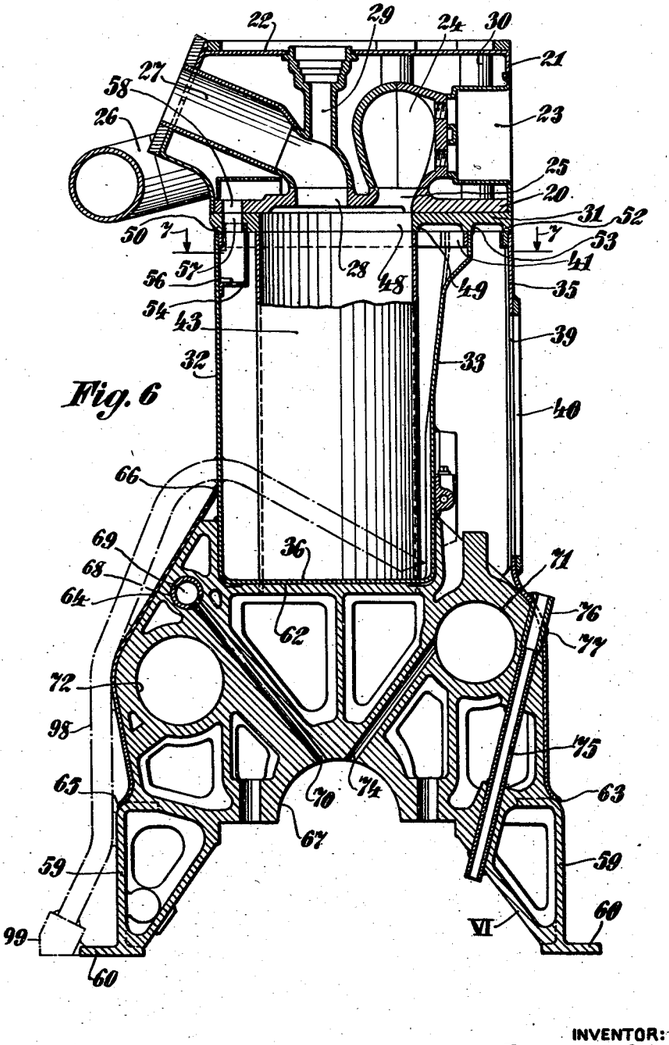
Figure 6 is a view in section, taken on line 6—6 of Figure 1, and looking in the direction of the arrows.
Figure 7:
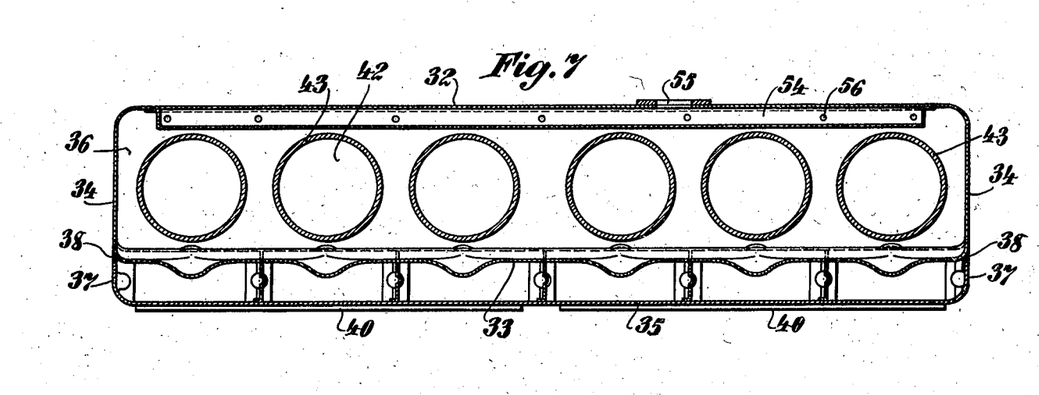
Figure 7 is a horizontal view in section, taken on line 7—7 of Figure 6, and looking in the direction of the arrows.
Figure 8:
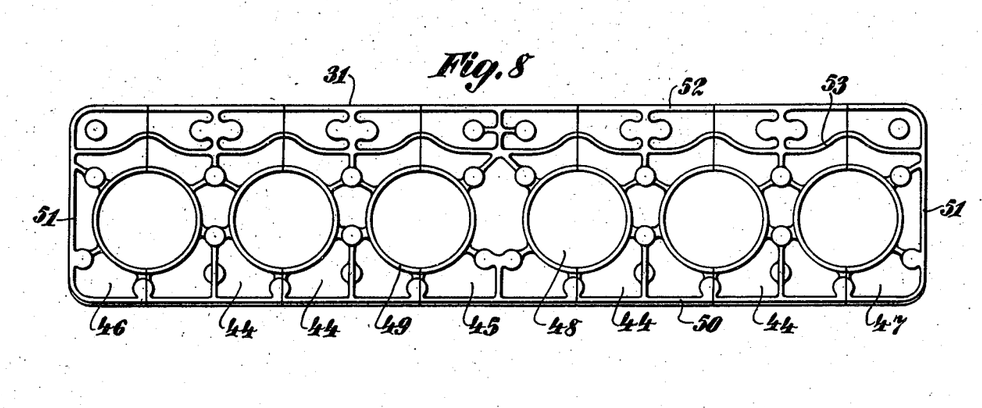
Figure 8 is a bottom view of the cylinder top plate shown in Figure 6.
Figure 9:
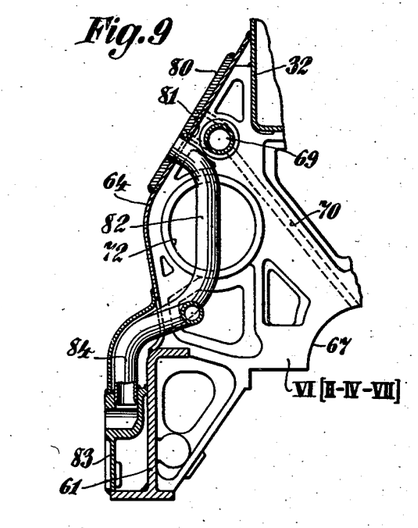
Figure 9 is a partial view in section showing the structure of bulkheads Nos. II, IV, VI, and VII of the crank case section.

As shown in Figure 8, the cylinder deck 31 is formed of a plurality of sections which may be standardized, the manufacture and assembly thereof thus being greatly facilitated. The top plate is composed of four similar sections 44 between pairs of which a section 45 is secured. A left-hand end section 46 is secured to the left-hand extremity of the assembly while a right-hand end section 47 is welded to the other end of the assembly. Figure 8 illustrates the finished top plate assembly after the sections have been welded together. Each of the sections 44 and 45 is formed with semi-circular recesses in the opposite sides thereof which, when assembled, form apertures 48 which serve as the upper portion of the cylinder. The cylinders are fuse-welded to bosses 49 which are formed beneath the plane of the top plate 31 to facilitate the assembly of the elements. The top plate 31 is also formed with a boss 50 at one side thereof which is extended around the ends as shown at 51 and continued about the edge of the top plate to form a boss 52 to which the outer wall 35 is welded. Between the end bosses 51, an irregular continuous boss 53 is formed on the top plate 31, the upper edge of wall 33 being welded thereto as shown in Figure 6.

Circulation of the cooling medium is facilitated by means of a manifold 54 which may receive a cooling medium through a suitable connection at an aperture 55, formed in the wall 32. The flow of this cooling medium may be regulated by providing suitable apertures 56 in the manifold and by forming apertures 57 in the top plate 31, these apertures registering with similar apertures 58 in the bottom plate 30 of the head section.

The crank case section of the engine is formed of a plurality of bulkheads upon which downwardly extending webs 59 are formed. the lower extremities thereof having horizontal flanges 60. The webs 59 and 60 are properly positioned by channel sections 61 which serve to space the bulkheads properly and, in combination with the webs 59, constitute a continuous channel by means of which the engine may be mounted in position. The webs 59 and channel sections 61 are fuse-welded along adjacent edges. The bulkheads are further formed with upper recessed portions 62 within which the crank case walls 32, 33 and bottom 36 are received. The side wall 35 is formed to curve outwardly and downwardly to accommodate the contour of the adjacent portions of the bulkheads, the wall terminating at the upper portions of the webs 59 and channel sections 61 being welded thereto as indicated at 63. A cover plate 64 is formed to overlie the opposite sides of the bulkhead sections, being welded at 65 to the upper portions of the webs 59 and channel sections 61 and at 66 to the side wall 32 of the cylinder block section.

Each bulkhead section is formed with hollow and cutaway portions to decrease the weight thereof without impairing the strength in accordance with proper engineering practice and, adjacent the lower portions thereof the bulkheads are cut away as indicated at 67 to receive crank shaft bearings.

Figure 1:
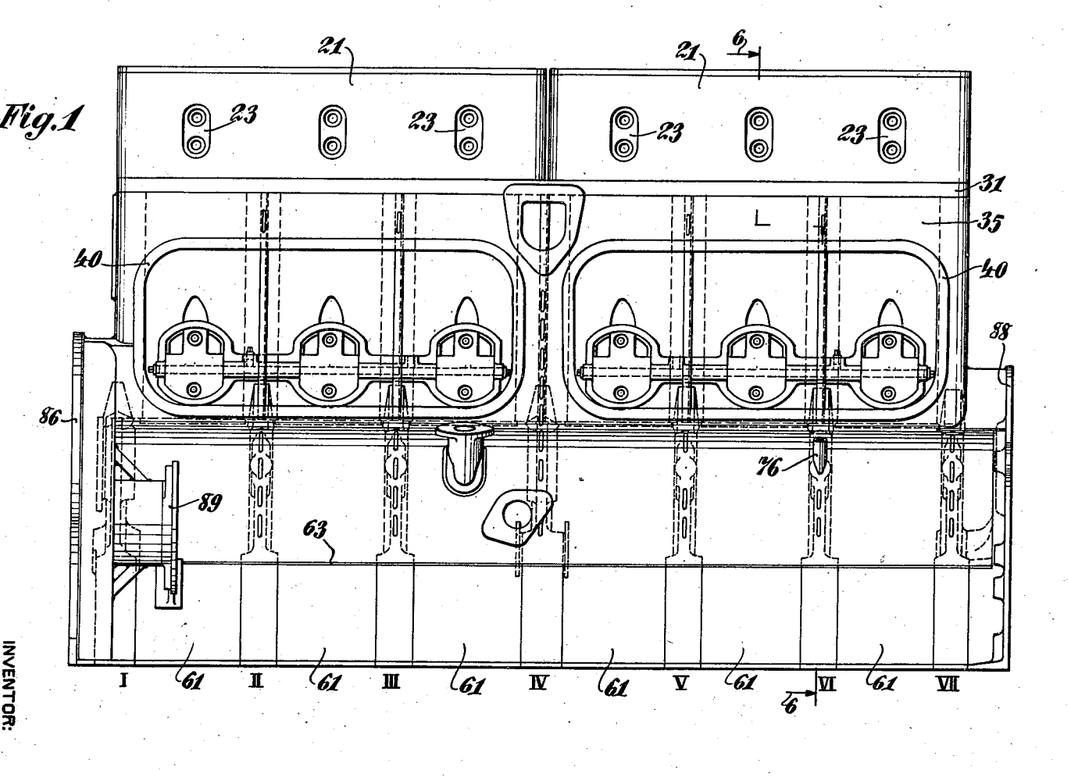
Figure 1 is a view in side elevation, showing an engine constructed in accordance with the present invention, the hand hole covers to the push rod compartments being removed in the interest of clearness.

In the engine shown, the crank case section is formed by seven bulkhead sections which are, in general, similarly formed but certain of which are formed with special features necessary to adapt them to assume additional functions over those assumed by the remaining bulkhead sections as will appear hereinafter. In the interest of clearness, the bulkhead sections are numbered consecutively from left to right in Figure 1 by Roman numerals which have been placed beneath the respective sections. These Roman numerals run from I to VII, inclusive, and will now be referred to in greater detail.

Extending through aligned apertures 68 in all of the bulkhead sections is an oil duct 69 which communicates with the respective bearings in recesses 67 through ducts 70 formed within the bulkhead sections. The bulkhead sections are also formed with aligned apertures 71 within which the cam shaft is adapted to be journaled, additional aligned apertures 72 being formed in the bulkhead sections upon the sides opposite from the cam shaft apertures 71 in order that an idler shaft may be journaled in the desired bulkheads. In the construction shown, the apertures 72 formed in bulkheads Nos. I and III are adapted to receive the bearings for the idler shaft, the aperture in bulkhead No. II being of sufficient size to receive the idler shaft and afford sufficient clearance between the shaft and the aperture.

In order that the idler shaft bearings may be adequately lubricated, bulkheads I and III are formed with oil ducts 73 through which oil flows from the crank shaft bearings carried by the respective bulkheads. Moreover, each bulkhead is formed with an oil duct 74 through which oil flows from the crank shaft bearings to the cam shaft bearings in apertures 71. In addition to the elements formed in all of the bulkheads as above described, bulkhead No. VI is drilled to receive an oil gauge tube 75 which is welded to the bulkhead No. VI and formed with a bushing 76, welded at 77 to the side plate 35, the bushing 76 projecting through the side plate to form a suitable opening. This construction is illustrated in the sectional view shown in Figure 6 and also in Figure 1.

Figure 2:
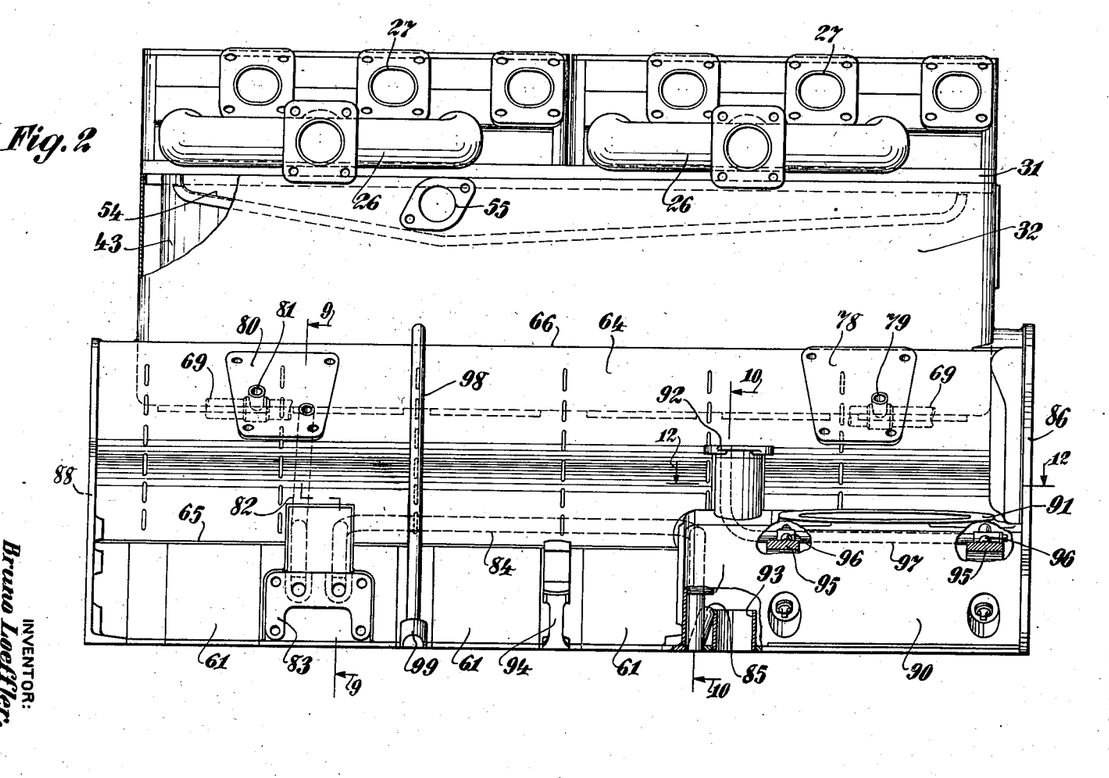
Figure 10:
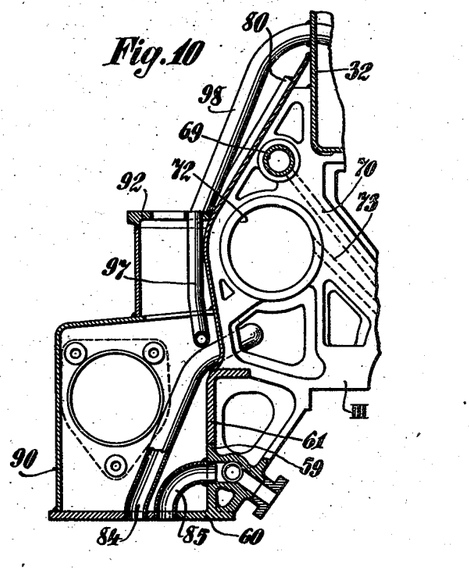
Figure 10 is a partial view in section showing the structure of bulkhead No. III of the crank case section.
Figure 11:
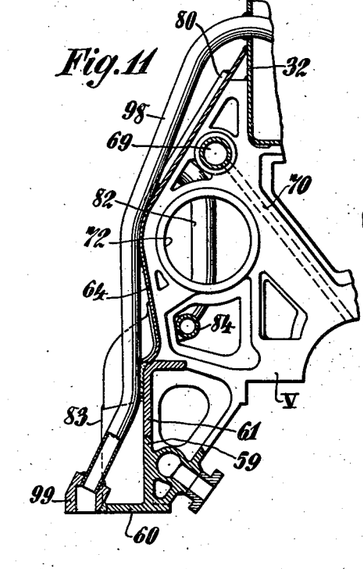
Figure 11 is a partial view in section, showing the structure of bulkhead No. V of the crank case section.
Figure 12:
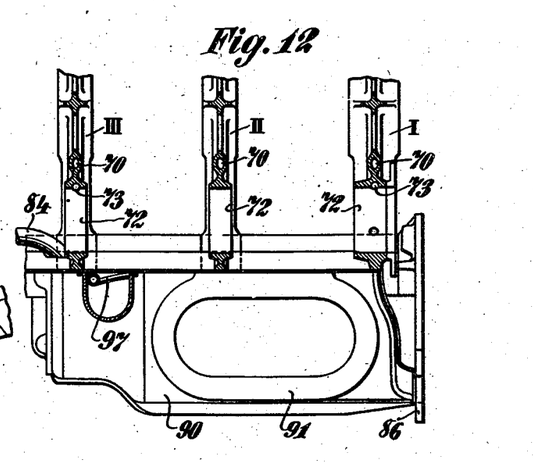
Figure 12 is a partial view in longitudinal section, showing the relationship of bulkheads Nos. I, II, and III.

The oiling system for the engine is partly formed in and partly carried by the crank case section, certain of the bulkheads being drilled and formed with ducts as will now appear. Referring to Figure 2, the crank case section is formed with a pad 78 upon which an oil cleaner is adapted to be mounted, the cleaner receiving oil through an aperture 79 and the duct 69. The crank case section is also formed with a pad 80 upon which an oil cooler is adapted to be mounted, the cooler receiving oil through a duct 81. The cooler discharges oil into a duct 82, the duct 82 receiving oil from an oil cleaner which is adapted to be mounted upon a pad 83, formed upon the crank case section. This oil cleaner receives oil from a duct 84 into which oil is delivered from an oil pump suitably mounted within the crank case. As indicated in Figure 10, the oil pump receives oil from the crank case sump through a duct 85.

The crank case section is provided with a front plate 86 which is adapted to cooperate with bulkhead No. I and is formed with a flange 87. A rear plate 88 is provided for the other end of the crank case section, this plate cooperating with bulkhead No. VII and being formed with suitable recesses to accommodate the crank shaft, cam shaft, etc. Upon the back of the front plate 86, is provided a mounting pad 89 upon which the magneto is adapted to be mounted, the other side of the engine being formed with a case 90 which constitutes the crank case for a compressor drive mechanism which is mounted upon a bearing pad 91, formed upon the case 90. The case 90 is also formed with a governor mounting 92 and is provided with a sleeve 93 through which may pass the driving elements of the oil pump. The crank case section is also provided with a bracket 94 upon which the water pump is mounted, this bracket being adapted to receive a drive shaft which is connected and aligned with the shaft within the compressor crank case 90.

Figure 3:
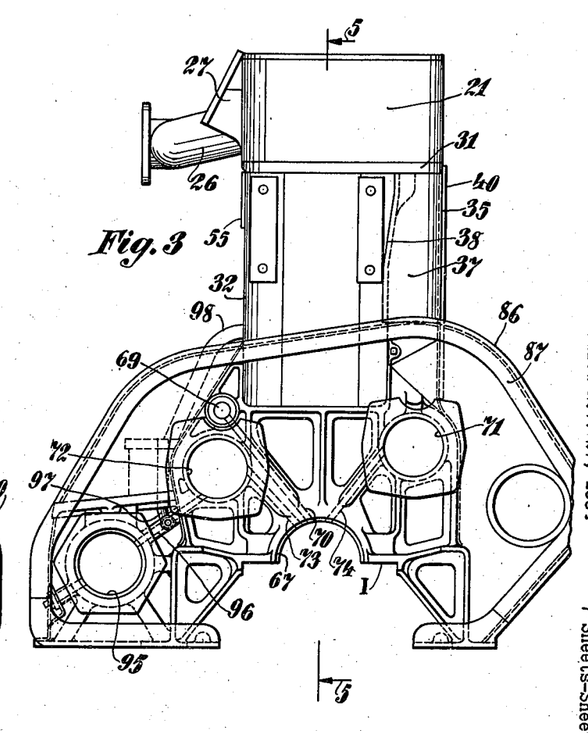
Figure 3 is a view in end elevation, looking from the left as viewed in Figure 1.
Figure 4:
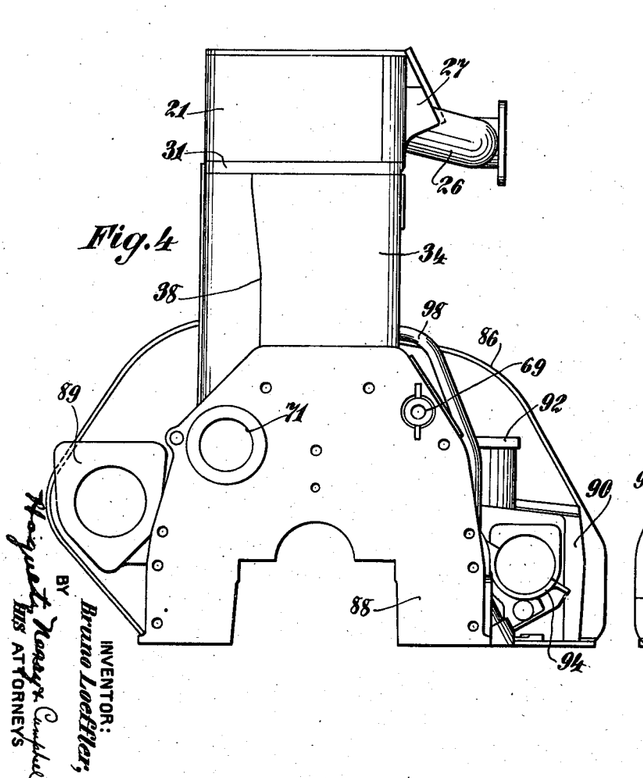
Figure 4 is a view in end elevation looking from the right of Figure 1.
Figure 5:
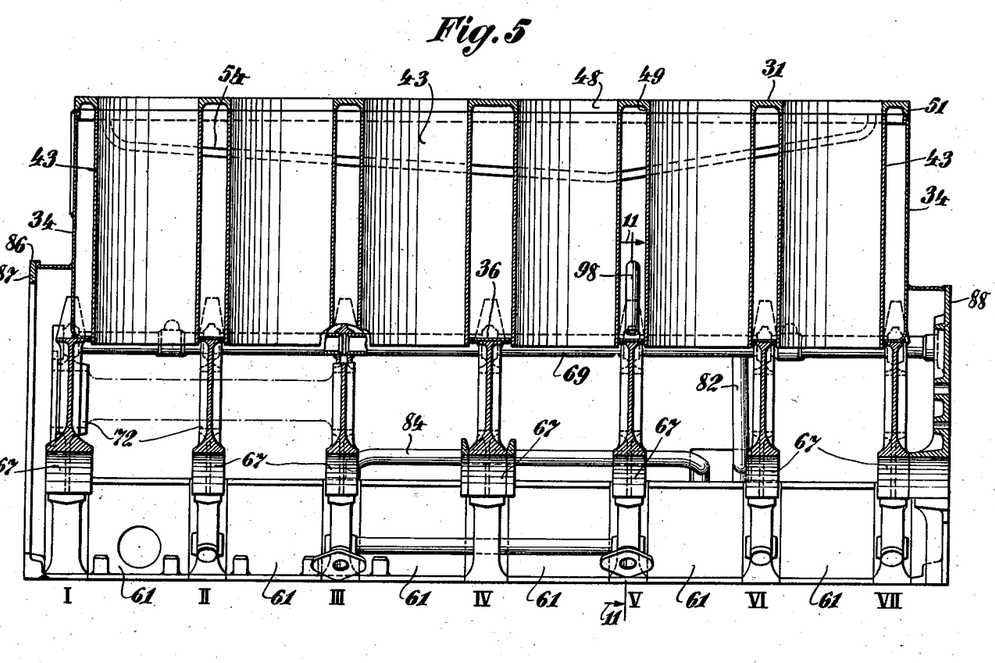
Figure 5 is a view in longitudinal vertical section taken on the line 5—5 of Figure 3, and looking in the direction of the arrows.

As will be seen from Figures 2 and 3, the compressor crank case 90 is provided with spaced bearings 95 within which the compressor crank shaft is journaled, these bearings being lubricated by ducts 96 which communicate with the idler shaft bearings 72. A longitudinally extending duct 97 communicates with the ducts 96 and carries the lubricant to the governor which is mounted upon pad 92. A water drain 98 is provided with one end extending into the cylinder block section adjacent the bottom thereof and the other end communicating with a suitable outlet connection 99.

While the invention has been described with specific reference to the accompanying drawings, it is not to be limited, save as defined in the appended claims.

I claim as my invention:

1. An internal combustion engine formed of a plurality of parts welded together including a cylinder block section and a crank case section, the cylinder block section having side and end walls, cylinders, a cylinder top plate having cylinder apertures therein, downwardly extending bosses on the top plate around the apertures, and bosses on the top plate at the sides thereof, said cylinders being welded to the first bosses and the side and end walls being welded to the last named bosses.

2. An internal combustion engine formed of a plurality of parts welded together including a cylinder block section and a crank case section, the cylinder block section having side and end walls and an outer wall spaced from one of the cylinders, a cylinder top plate having cylinder apertures therein, downwardly extending bosses on the top plate around the apertures, downwardly extending bosses on the top plate at the sides thereof, and a downwardly extending boss on the top plate spaced from one side thereof, said cylinders being welded to the first bosses, the side and end walls being welded to the bosses at the sides of the top plate, and the outer wall being welded to the boss spaced from one side of the top plate.

3. An internal combustion engine formed of a plurality of parts welded together including a cylinder block section and a crank case section, the crank case section being formed of a plurality of bulkheads having webs formed upon opposite sides thereof, and channel sections welded to the webs between the sides of adjacent bulkheads, the webs and channel sections having substantially the same shape.

4. An internal combustion engine formed of a plurality of parts welded together including a cylinder block section and a crank case section, the crank case section being formed of a plurality of bulkheads having webs formed upon opposite sides thereof, channel sections welded to the webs between the sides of adjacent bulkheads, the webs and channel sections having substantially the same shape, and side plates welded to the sides of the bulkheads at the channel sections.

5. An internal combustion engine formed of a plurality of parts welded together including a cylinder block section and a crank case section, the crank case section being formed of a plurality of bulkheads having cut-away portions to receive crank case bearings and apertures to receive cam shaft bearings, said bulkheads being drilled between the cut-away portions and the apertures to permit oil to flow therebetween.

6. An internal combustion engine formed of a plurality of parts welded together including a cylinder block section and a crank case section, the crank case section being formed of a plurality of bulkheads having cut-away portions to receive crank case bearings, and means forming an oil duct extending between the bulkheads, the bulkheads being formed with ducts between the first named ducts and the cut-away portions thereof.

7. An internal combustion engine formed of a plurality of parts welded together including a cylinder block section and a crank case section, the crank case section being formed of a plurality of bulkheads having cut-away portions to receive crank case bearings, means forming an oil duct extending between the bulkheads, the bulkheads being formed with ducts between the first named ducts and the cut away portions thereof, the bulkheads having apertures therein to receive cam shaft bearings and ducts formed therein between the cut-away portions and last named apertures to permit oil to flow therebetween.

8. An internal combustion engine formed of a plurality of parts welded together including a cylinder block section and a crank case section, the cylinder block section having side and end walls, cylinders, and a cylinder top plate formed of a plurality of sections welded together, certain of the sections being of similar shape and having cooperating portions forming cylinder apertures.

9. An internal combustion engine formed of a plurality of parts welded together including a cylinder block section and a crank case section, the crank case section being formed of a plurality of bulkheads having cut-away portions to receive crank case bearings and apertures to receive idler shaft bearings, said bulkheads being drilled between the cut-away portions and the apertures to permit oil to flow therebetween.

10. An internal combustion engine formed of a plurality of parts welded together including a cylinder block section and a crank case section, the crank case section being formed of a plurality of bulkheads having cut-away portions to receive crank case bearings, means forming an oil duct extending between the bulkheads, the bulkheads being formed with ducts between the first named ducts and the cut-away portions thereof, the bulkheads having apertures therein to receive cam shaft bearings and ducts formed therein between the cut-away portions and last named apertures to permit oil to flow therebetween, certain of the bulkheads further being formed with apertures to receive idler shaft bearings, said bulkheads being drilled between the cut-away portions and the apertures to permit oil to flow therebetween.

11. An internal combustion engine formed of a plurality of parts welded together including a cylinder block section and a crank case section, the crank case section being formed with bearing recesses, and a compressor crank case welded to the crank case section, the compressor crank case being formed with bearing recesses and ducts between the recesses and one of the first named bearing recesses.

12. An internal combustion engine formed of a plurality of parts welded together including a cylinder block section and a crank case section, the crank case section being formed with a conduit communicating with cut-away portions in the crank case section to receive crank shaft bearings, bosses on the crank case section to mount an oil cooler and an oil cleaner, and conduits in the crank case to direct an oil flow from the crank case to the cleaner, cooler, and to the first named conduit.

13. An internal combustion engine formed of a plurality of parts welded together including a cylinder block section and a crank case section, the crank case section being formed with a conduit communicating with cut-away portions in the crank case section to receive crank shaft bearings, bosses on the crank case section to mount an oil cooler and an oil cleaner, a boss on the crank case section having a duct communicating with the first named conduit, said boss being adapted to mount an oil cleaner, and conduits in the crank case to direct an oil flow from the crank case to the cleaner, cooler, and to the first named conduit.

BRUNO LOEFFLER.